(12) United States Patent
Von Rhein

(10) Patent No.: US 6,238,713 B1
(45) Date of Patent: May 29, 2001

(54) PROCESS FOR PRODUCING AN OXIDATION-PROTECTED VITAMIN C PREPARATION

(76) Inventor: Wolfgang Von Rhein, 44, Lerchenstrasse, D-45134 Essen (DE)

( * ) Notice: Subject to any disclaimer, the term of this patent is extended or adjusted under 35 U.S.C. 154(b) by 0 days.

(21) Appl. No.: 09/355,676
(22) PCT Filed: Nov. 29, 1997
(86) PCT No.: PCT/EP97/06660
§ 371 Date: Nov. 2, 1999
§ 102(e) Date: Nov. 2, 1999
(87) PCT Pub. No.: WO98/33397
PCT Pub. Date: Aug. 6, 1998

(30) Foreign Application Priority Data

Jan. 31, 1997 (DE) .............................................. 197 03 469

(51) Int. Cl.⁷ ...................................................... A23L 1/30
(52) U.S. Cl. ............................. 426/72; 426/486; 424/400
(58) Field of Search .............................. 549/315; 514/474, 514/944; 426/76, 486; 424/400

(56) References Cited

U.S. PATENT DOCUMENTS

| 4,560,570 | * | 12/1985 | Rausing et al. ...................... 426/564 |
| 5,431,939 | * | 7/1995 | Cox et al. ............................. 426/300 |
| 6,010,706 | * | 1/2000 | Candau et al. ....................... 424/401 |

* cited by examiner

Primary Examiner—Thurman K. Page
Assistant Examiner—Liliana Di Nola-Baron
(74) Attorney, Agent, or Firm—Blakely Sokoloff Taylor & Zafman

(57) ABSTRACT

A method of manufacturing an oxidation-protected Vitamin C product is disclosed, said method comprising dissolving ascorbic acid crystals in water, expelling free oxygen from the water, mixing the solution with a gel-forming agent, introducing the gel into a deformable tube and sealing the tube in an air-tight manner.

7 Claims, No Drawings

PROCESS FOR PRODUCING AN OXIDATION-PROTECTED VITAMIN C PREPARATION

Vitamin C preparations are currently commercially available in the form of crystalline ascorbic acid or pressed tablets. Ascorbic acid is known to have a strongly reducing action and is rapidly decomposed by light and atmospheric oxygen. Without particular protective measures, ascorbic acid is only suitable for immediate consumption.

Protective measures in the form of a completely airtight and light-protected closure have in practice prevented people from adding vitamin preparations to foodstuffs, particularly salads or fruit dishes and thus achieving both a particular taste character and a health effect.

This is where the invention steps in. It is the object of the invention to make a Vitamin C preparation available in ready-to-use form which has a high protection against oxidation and light and can nevertheless be readily dosed and administered.

In order to solve this object the method referred to above is characterised in accordance with the invention in that the ascorbic acid crystals are dissolved in water;

that free oxygen is expelled from the water;

that the oxygen-free water, containing the dissolved ascorbic acid crystals, is mixed with a gel-forming agent, which causes the water to gel into a pasty state;

that the gel is introduced into a tube of a material which is deformable in a gas-tight and plastic manner—substantially free of restoring forces; and that the tube is sealed in an airtight manner after it has been completely filled with gel.

The gelled Vitamin C preparation in the tube has a lasting protection against light and oxidation and may accordingly be stored for a long time, even when the tube has been partially or substantially emptied. After using the tube and closing the tube lid, there is only an extremely small air volume within the tube which corresponds at most to the internal volume of the tube lid. If the tube lid is suitably constructed, for instance in the form of a non-return valve, this residual volume can also be substantially eliminated. The previously unachieved combination of the advantages of long life and storage stability of a Vitamin C preparation (even after opening the closure many times) and the simple and ergonomic dosability by squeezing a tube are therefore achieved with the invention. The Vitamin C preparation manufactured in accordance with the invention can thus be used as a taste-improving and health-promoting food additive until the content of the tube has been completely used up.

There are various possibilities for expelling the free oxygen from the water. These include evacuating a container accommodating the water. Preferably, however, the free oxygen is expelled from the water by the application of an inert gas, particularly $CO_2$ or $N_2$. This inert gas can be used as a protective gas atmosphere for the entire duration of the treatment, that is to say whilst dissolving the ascorbic acid crystals in water and mixing in the gel forming agent and during the gelling process and the introduction of the finished Vitamin C preparation into tubes. The addition of the ascorbic acid crystals to the water and the introduction of the gel-forming agent into the degassed water are preferably effected in separate stages and in separate containers.

Any air- and light-impermeable material, which has poor elasticity properties and thus belongs to the typically plastically deformable materials, is suitable as the tube material. A tin foil material, which is preferably coated with a taste-neutral layer, particularly with a thin plastic layer, has proved to be particularly suitable. It is important that the at least one coating layer does not substantially alter the plastic properties of the supporting tube material and, in particular, does not make the tube elastically deformable.

It is recommended that the tube nozzle, which has a comparatively narrow opening cross-section, be constructed relatively long so that after opening and closing the tube the gel can retract within the narrow interior of the nozzle. Oxidation can therefore occur only at the minute surface of the internal cross-section of the nozzle, even after long storage times. This residual oxidation has proved in practice to be harmless.

What is claimed is:

1. A method of manufacturing an oxidation-protected Vitamin C product comprising:

dissolving ascorbic acid crystals in water to form a solution;

expelling free oxygen from the water;

after expelling, mixing the dissolved ascorbic acid crystals with a gel-forming agent to form a gel;

introducing the gel into a tube of a material which is deformable in a gas-tight and substantially plastic manner—with low restoring forces; and after introducing, sealing the tube in an airtight manner.

2. The method of claim 1, wherein expelling free oxygen comprises introducing an inert gas into the solution.

3. The method of claim 1, wherein expelling free oxygen comprises evacuating a container accommodating the water.

4. The method of one of claim 1 and claim 2, wherein each of dissolving the ascorbic acid crystals in the water, mixing with the gel-forming agent and introducing the gel into tubes is effected under a protective gas atmosphere.

5. The method of one of claim 1, claim 2, and claim 3, wherein the material of the tube comprises tin foil.

6. The method of claim 5, wherein the tube material comprises plastic-coated tin foil.

7. A method comprising:

mixing ascorbic acid crystals and a gel-forming agent in water to form a gel substrate for human consumption;

expelling any free oxygen from the gel;

introducing the gel into a tube having properties including deformability in a substantially plastic manner and gas impermeability; and sealing the tube in an air-tight manner.

* * * * *